Patented Oct. 6, 1942

2,297,828

UNITED STATES PATENT OFFICE 2,297,828

COUPLING

William R. Flatford, Bartlesville, Okla., assignor to Phillips Petroleum Company, a corporation of Delaware Application May 12, 1941, Serial No. 393,101

2 Claims. (Cl. 173—328)

This invention relates to a coupling member for establishing electrical and mechanical connection between the electrodes and the electrical cables in well logging apparatus.

The present invention provides a coupling member by which various arrangements of electrodes may be used with the same electrical cable. By means of the coupling member the cable may be quickly attached or detached from an electrode assembly allowing the operator to choose the arrangement of electrodes best suited to the conditions in the well bore to be logged. Coupling devices for joining a cable to an electrode present a mechanical problem not encountered ordinarily in making electrical connections under less severe conditions. The well bore in which electrical logging is carried out usually contains water or drilling fluid which is electrically conductive and is under high pressures; in many cases pressures on the order of thousands of pounds per square inch are encountered. Leakage of the fluid into a coupling member causes shorting of the electrical circuit and makes the electrical logging records worthless. Not only must the coupling member be fluid tight under high pressures, but it must also be so constructed as to carry the weight of the electrode assembly and properly distribute the weight on the electrical cable. The present invention provides a cable coupling device which is especially useful for joining well logging electrodes to the electrical cable connecting the electrodes with equipment at the surface of the earth.

An object of this invention is to provide a coupling device for making connection between the well logging electrodes and the electrical cable in electrical logging apparatus.

Another object of this invention is to provide such a coupling device, which will be fluid-tight under the pressure existing in a well bore.

Other objects and advantages will be apparent from the detailed description and accompanying drawings.

Figure 1:
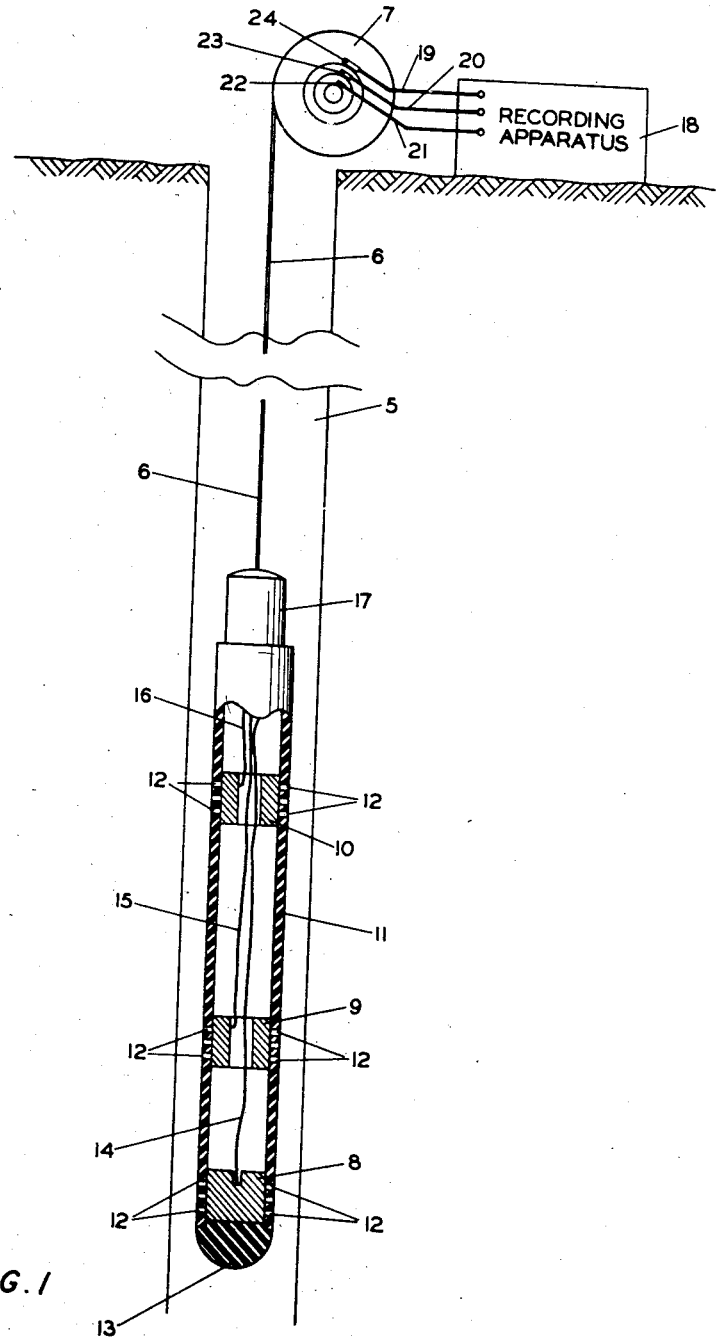
Figure 1 is an elevational view, partly in cross section, of the well logging electrodes and the coupling suspended in a well bore.

With reference to Figure 1 of the drawings the numeral 5 designates the well bore into which an electrical logging electrode assembly is suspended by means of a cable 6 containing a plurality of electrical conductors. The cable may be extended or retracted in the well bore by means of a suitable cable reel 7 at the surface of the earth. The metallic electrodes comprising a lower electrode 8, a middle electrode 9 and an upper electrode 10, are spaced along a tubular support 11 of suitable electrical insulating material, for example, fabric saturated with resin. The electrode assembly is made up of the three electrodes, longitudinally spaced each from the other along the well bore to give, insofar as possible, the desired penetration of electrical current into the earth formations adjacent to the bore hole. The drilling fluid or other liquid in the well bore makes contact with the electrodes through the holes 12 in the supporting member 11. The bottom of the tubular supporting member 11 is closed by the plug 13. The electrodes are in electrical communication with conductors in cable 6 through means of the electrical conductors 14, 15 and 16 which are connected to the conductors of cable 6 through electrical contacts within the housing 17 of the coupling member. The electrical conductors contained in the cable 6 are connected to suitable recording apparatus 18 and incidental equipment, not shown in the drawings, by conductors 19, 20 and 21 through slip ring and brush connections 22, 23 and 24 on the cable reel.

Figure 2:
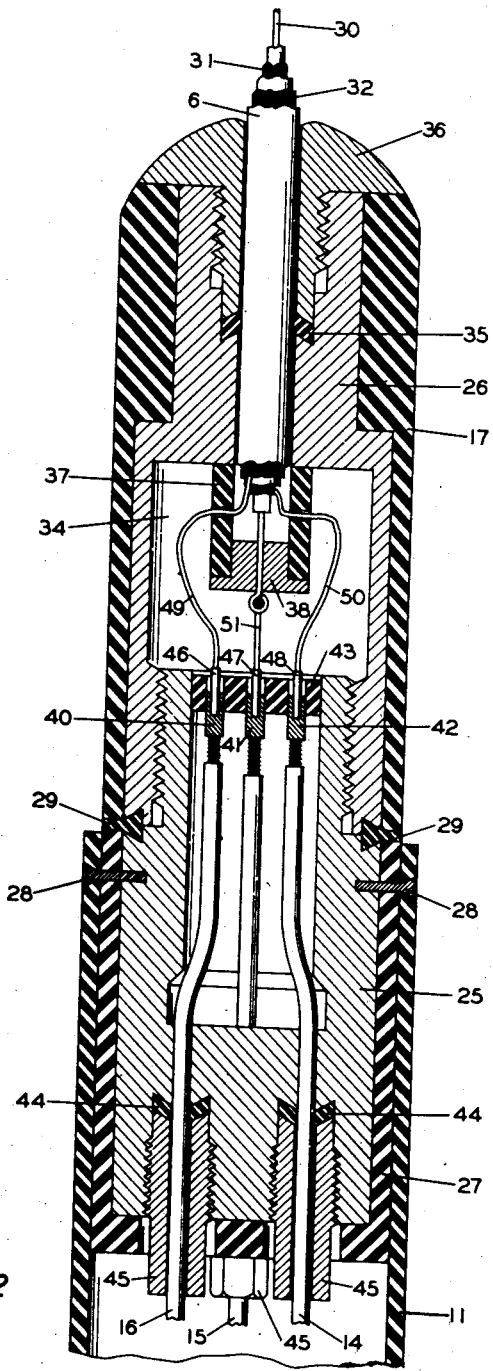
Figure 2 is a cross sectional view of the coupling member.

With reference to Figure 2 of the drawings, the body of the coupling member consists of a male member 25 and a female member 26 which are complementary and are joined together by screw threads when the coupling is made up as in the figure. The female member is protected from contact with fluid in the well bore by the electrically insulating housing 17 previously referred to in connection with Figure 1. The exterior of the male member is similarly protected from contact with the well fluid by the covering 27 of electrical insulation. The support 11 for the well logging assembly is attached to the male member 25 by the screws 28. The gasket 29 makes the joint between the male and female members fluid-tight when the joint is made up.

The cable 6 comprises a central conductor 30 of high tensile strength and two concentric conductors 31 and 32 insulated from each other and from the fluid of the well bore by suitable electrical insulation. The cable 6 extends through the upper part of the female member into the compartment 34 in the interior of the coupling. Leakage of the well fluid into the interior of the coupling past the cable 6 is prevented by the resilient packing 35 which is held in position by the packing gland 36. The cable 6 terminates in the compartment 34 inside a sleeve 37 of electrical insulating material. The central, or weight carrying conductor 30 extends through sleeve 37 and the plug 38 to which the conductor is attached. The weight of the electrode assembly and of the coupling is carried by the cable 30 through the means of the weight supporting member consisting of the sleeve 37 and plug 38. The sleeve 37 of insulating material is under a compression load and is thus capable of supporting the weight imposed upon it by the electrode assembly and the coupling.

Electrical conductors 14, 15 and 16 extend through the lower part of the male member 25 of the coupling and terminate in jacks 40, 41 and 42 mounted in the male member, and insulated therefrom, by electrical insulating disk 43. Leakage of well fluid into the interior of the coupling member at the point of entry of the conductors 14, 15 and 16 is prevented by the resilient packings 44 and packing glands 45. The electrical connection between the insulated conductors 14, 15 and 16 and the conductors 30, 31 and 32 of the cable 6 is made through the jacks and the corresponding pins 46, 47 and 48. The pin 47 is attached to the conductor 30 at the plug 38 by means of the insulated lead 51. Pins 46 and 48 are connected to conductors 32 and 31 respectively by the insulated leads 49 and 50 which pass through the walls of the insulating sleeve 37.

The resilient packings 35 and 44 are adapted to make a fluid-tight seal around the conductors to prevent high pressure well fluid from gaining access to the interior of the coupling member and short circuiting the electrical circuit. For this reason, the resilient packing is frustro-conical in shape to give it a wedging action against the conductors when external pressure is applied to the packing.

The coupling is easily taken apart or put together allowing electrode assemblies to be quickly changed or the electrical connections readily inspected. To take the coupling apart, the packing gland 36 is unscrewed to release the packing 35 and allow freedom of movement between the female portion of the coupling and the cable 6. The female and male members are then parted at the screw threaded joint and the female member moved along the cable. The insulating sleeve 37 and the plug 38 are not attached to the member 26 but remain at the end of the cable 6. The pins 46, 47 and 48 can then be removed from the corresponding jacks 40, 41, and 42 and the electrical circuit broken.

To assemble the coupling, the pins 46, 47 and 48 are inserted in the jacks, the male and female members 25 and 26 of the coupling screwed together, and the packing gland 36 screwed into place.

While I have herein shown and described a preferred embodiment of my invention, it is understood that various changes may be made in the size, shape, and relative positions of some of the parts of the device without departing from the spirit of the invention.

I claim:

1. In a coupling for well logging apparatus, the combination comprising a body member; a multiple conductor cable extending through the body member, said cable having a weight supporting conductor; and a weight supporting member attached to the weight supporting conductor and electrically insulated from the body member, said weight supporting member being compressively loaded and transmitting the weight associated with said coupling to the weight supporting conductor of said cable.

2. In a coupling for well logging apparatus the combination comprising a body member, a multiple conductor cable extending through the body member, said cable having a weight supporting conductor, a plug attached to the weight supporting conductor, and an insulating sleeve of electrical insulation interposed between the plug and the body member whereby the weight associated with said coupling is transmitted to the weight supporting conductor through the compressively loaded insulating sleeve.

WILLIAM R. FLATFORD.